United States Patent [19]

Nelson

[11] Patent Number: 5,008,315

[45] Date of Patent: * Apr. 16, 1991

[54] COMPOSITION

[75] Inventor: Linda H. Nelson, Evansville, Ind.

[73] Assignee: General Electric Company, Mt. Vernon, Ind.

[ * ] Notice: The portion of the term of this patent subsequent to Sep. 26, 2006 has been disclaimed.

[21] Appl. No.: 452,479

[22] Filed: Dec. 19, 1989

[51] Int. Cl.$^5$ ................................................ C08K 5/58
[52] U.S. Cl. .................................... 524/180; 524/476; 524/481; 524/504; 524/513
[58] Field of Search .................. 524/476, 180, 481

[56] References Cited

U.S. PATENT DOCUMENTS

| | | | |
|---|---|---|---|
| 3,759,863 | 9/1973 | Czekay | 524/180 |
| 3,947,367 | 3/1976 | Foelsch et al. | 252/51.5 A |
| 4,174,325 | 11/1979 | Pischtschan et al. | 524/287 |
| 4,399,251 | 8/1983 | Lee | 524/481 |
| 4,408,000 | 10/1983 | Lee | 524/315 |
| 4,626,566 | 12/1986 | Miller et al. | 524/490 |
| 4,870,124 | 9/1989 | Nelson | 524/490 |

FOREIGN PATENT DOCUMENTS 177096  4/1986  European Pat. Off. .

Primary Examiner—Paul R. Michl
Assistant Examiner—John J. Guarriello
Attorney, Agent, or Firm—Martin B. Barancik

[57] ABSTRACT

A composition comprising an admixture of (a) polybutylene terephthalate, (b) an impact modifying effective amount of an ABS or ABS type resin, and (c) a mold release and/or impact resistance improving effective amount of a fluid hydrogenated or non hydrogenated oligomer of an alpha olefin.

13 Claims, No Drawings

COMPOSITION

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Polybutylene terephthalates have been known for many years as having excellent properties when molded. Depending inter alia upon the part molded, a mold release agent can be added to the formulation. Release agents used in the past include polyethylene waxes, and Comboloob formulations, a petroleum wax blended with polyethylene.

Various blends of polybutylene terephthalate with other resins have also proven to be significant. For example, blends of polybutylene terephthalate with ABS or ABS type resins are well known and often require a mold release agent. Still further polybutylene terephthalate, ABS or ABS type blends together with significant quantities of polycarbonate have had significant marketing success and sometimes have mold release agents therein.

Acrylonitrile-butadiene-styrene resins, usually abbreviated as ABS resins, also have a similar problem. Previously ethylenediamine bisstearamide has been incorporated into ABS resins as a lubricant, see U.S. Pat. No. 3,947,367. A further additive(s) which has been disclosed as having generally a lubricating action and utilized to help increase the moldability of ABS resin are the esters of monocarboxylic saturated aliphatic acids with polyvalent alcohols of high molecular weight, see U.S. Pat. No. 4,174,325 wherein pentaerthritylтетrastearate was employed. It also has been known to use in general mineral oils for the release of certain thermoplastics such as polycarbonate from molds. Such mineral oils are described in Japanese application numbers K53,22556; K79,16559; K72,41093; K80,84353 and GB patent number 2077742. Mineral oils are naturally occurring complex mixtures of hydrocarbons that are obtained from petroleum. Additionally 0.1 to 3.0 weight percent of a mineral oil has been employed to increase the impact strength and improve flowability of an ABS resin, see European Patent Application 177096. These mineral oils are (1) paraffinic in nature with straight or branched chains containing at least 20 carbon atoms, (2) naphthenic or relatively naphthenic—i.e., constituted at least prevailingly by saturated, monocyclic, of from 4 to 12 carbon atoms and polycyclic, of from 13 to 26 carbon atom hydrocarbons, or (3) the aromatic oils having a minimum molecular weight around 300. All these oils show a minimum flash point in closed cup, according to ASTM D 93, of 150° C. However, the resin compositions with the mineral oil are prepared by adding the mineral oil to the actual manufacturing process of the ABS resin. For example the oils are added during the endstage of the grafting reaction or before the coagulation of the latex to the grafted polymer. Therefore the resulting ABS resin composition does not appear to be a mere admixture of the ABS resin and the mineral oil. Rather the oils appear to be at least substantially intermingled during the actual manufacturing process of the ABS resin.

U.S. Pat. No. 3,759,863, incorporated within, discloses a four component composition of polyvinylchloride, a certain type of ABS, a dialkyltin mercaptide stabilizer and a lubricant which is described as essentially containing hydrocarbons with at least 16 carbon atoms. A mineral oil of hydrocarbons with 20 to 30 carbon atoms, having a boiling range of above 350° C. and a refraction index of $n_D^{20}=1.4816$ are preferred.

U.S. Pat. No. 3,403,120 discloses as a lubricant for ABS a paraffinic, naphthenic or aromatic mineral oils preferably having a certain viscosity range. At least 3 wt. % of the lubricant should be used. The additive is added to the coagulum of the latex of the polymeric components, incorporation inside the anhydrous pellets or by admixing into the latex and then coagulating the latex.

In none of these publications is there an indication that the lubricant was functioning as a mold release agent.

Recently synthetic mineral oils derived from the oligomerization of alpha olefins followed by hydrogenation to remove unsaturation has provided surprising benefit in the area of mold release agents for various materials. Miller et al, U.S. Pat. No. 4,626,566 described and claims aromatic carbonate polymer compositions and admixture with a hydrogenated alpha olefin oligomer fluid. Additionally U.S. Pat. No. 4,826,913 discloses the use of such oligomer fluids as mold release effective agents for various other polymers including organic polyesters, poly(arylene oxide)s, poly(arylene sulfide)s, poly(etherimide)s and polysulfones. However to this date there has been no known admixture of these synthetic oligomers fluids with an ABS resin.

A known mold release agent for polycarbonate and ABS resin is an alpha olefin, see U.S. Pat. No. 4,399,251.

Blends of polycarbonate and ABS or ABS type resins have been known for many years. Mold release can also be an issue with respect to these blends. PETS has been utilized as a mold release agent in these blends. A recent European patent application EP 248308 has disclosed that polycarbonate ABS blends have a different melt behavior compared to pure polycarbonate. It also discloses that such blends can have enhanced mold release with the addition of an ester of saturated aliphatic $C_{10}$–$C_{22}$ carboxylic acids and thihydric alcohol.

SUMMARY OF THE INVENTION

In accordance with the invention there is a composition comprising an admixture of (a) polybutylene terephthalate and (b) an impact modifying effective amount of ABS or ABS type resin and (c) a mold release and/or a impact improving effective amount of a fluid hydrogenated or non hydrogenated oligomer of an alpha-olefin.

Another aspect of the invention is that the admixture can occur with the already manufactured ABS or ABS type resin.

A further aspect of the invention is the absence or essential absence of polyvinyl chloride and/or a dialkyltin mercaptide stabilizer from the composition.

Additionally, polycarbonate can also be present in the composition of the invention.

DETAILED DESCRIPTION OF THE INVENTION

Polybutylene terephthalate can be prepared by any of the well known methods in the art. The term polybutylene terephthalate includes polyesters wherein up to 50 mole percent of the butylene units are replaced by other glycols in the preparation providing an alkylene residue in the polymer. Examples of such glycols include ethylene glycol, propylene glycol, cyclohexane glycol, 1,4 cyclohexane dimethanol and the like.

The ABS composition or ABS type composition which is employed in this invention is the usual standard ABS compositions known throughout the industry. An ABS or ABS type composition comprises from (a) about 10 to 90 weight percent of a mixture of acrylonitrile and styrene or alpha-methyl styrene wherein the acrylonitrile is from about 10 to 50 weight percent of the reactant mixture and the styrene and/or alphamethyl styrene is from about 50 to 90 weight percent of the reactant and (b) about 90 to 10 weight percent of polybutadiene or polyisoprene, preferably polybutadiene. Up to about 50 wt. % of the polybutadiene or polyisoprene can be replaced by the styrenic material. Of course, copolymers of acrylonitrile and styrene and/or alpha-methyl styrene are also present in the ABS type material. Additionally wherein acrylonitrile is used either some or all of the acrylonitrile can be replaced with methylmethacrylate. The preferred resins are acrylonitrile butadiene styrene (ABS) or methylmethacrylate butadiene styrene (MBS). With respect to MBS a preferred configuration is coreshell. These resins may be made by any of the well known methods including suspension polymerization, bulk polymerization, or bulk suspension polymerization as well as typically well known methods directed to the core shell preparations.

The aromatic polycarbonates useful in the invention are the usual aromatic polycarbonates well known in the literature for many years. The aromatic polycarbonates are prepared from the reaction of a dihydric phenol and a carbonate precursor. The dihydric phenols useful in preparing the aromatic polycarbonates include those of the formula.

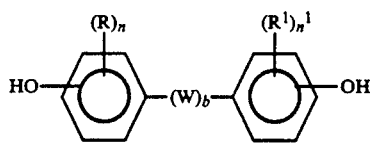

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, —S—, —S—S—, —O—,

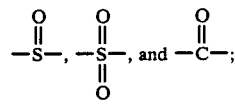

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula—$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4 -dihydroxydiphenyl ether;
4,4 -thiodiphenol;
4,4 -dihydroxy-3,3 -dichlorodiphenyl ether; and
4,4 -dihydroxy-2,5-dihydroxydiphenyl ether.

The hydrogenated or non hydrogenated alpha-olefin oligomer fluids useful in this invention are derived from the oligomerization of alpha olefins through a catalytic reaction followed by optional hydrogenation to remove residual unsaturation. Examples of such catalysis include: cationic catalysis, see J. A. Breenan, Ind. Eng. Chem. Prod. Res. DIv. (1980) 19,2; Ziegler catalysis, see D. H. Antonsen et al, Ind. Eng. Chm. Prod. Res. Div. (1963), 2,224; or metathesis catalysis, see W. T. Nelson et al, Ind. Eng. Chem. Prod. Res. Div., (1983), 22, 178b and references therein. Methods of preparation are also disclosed in U.S. Pat. Nos. 4,282,392; 4,225,739; 4,319,065; 4,311,864; 4,334,113 and 4,409,415 and references therein.

The product of oligomerization/hydrogenation is a mineral oil with fluidity over a wide temperature range.

The product generally is a mixture of oligomers of various degrees of polymerization, branching and isomerization depending on the nature of the catalyst and olefin used and any subsequent product fractionation such as by distillation. A product structure representative of this type of oligomerization is 9-methyl-11-n-octyl heneicosane. Normal alpha olefins of 6-12 carbon atoms are preferred for the preparation of synthetic fluids, with 1-decene being most common. The oligomers are generally separated into various mixtures of dimer, trimer, tetramer and pentamer to achieve varying degrees of volatility, viscosity and viscosity index. The preferred alpha-olefin oligomer fluids for this invention are those with a kinematic viscosity of approximately 2-10 cSt at 100° C. as determined by ASTM D445. Such oligomer fluids are commercially available from Emery Industries, and are known as Emery 3002, Emery 3004, Emery 3006 and Emery 3010. The approximate composition of these fluids, as determined by gas chromatography, is shown below.

|  | DIMER | TRIMER | TETRAMER | PENTAMER | AVG. # CARBONS |
|---|---|---|---|---|---|
| 3002 | 100% | — | — | — | 20 |
| 3004 | — | 89 | 11 | — | 31 |
| 3006 | — | 29 | 62 | 9 | 38 |

Alternatively, the Synfluids manufactured by Gulf Oil Corporation also may be used. The hydrogenated oligomers are preferred.

The non-hydrogenated oligomers are prepared in a similar manner but the hydrogenation step is omitted. Noedene alpha olefins, available from Shell Chemical Company can be used.

The quantities of polybutylene terephthalate and ABS or ABS type resin can vary widely. As measured by quantities of PBT and ABS or ABS type resin. The ABS or ABS type resin is anywhere from about 3 to about 95 wt. %, generally from about 4 to about 80 wt. %. Quantities of ABS or ABS type resin are commonly from about 10 to 50 wt. %. Other polymers may also be present in the admixture of significance is polycarbonate. Polycarbonates can vary from about 5 to 200 wt. % of the PBT and ABS or ABS type resin, preferably from about 10 to 150 wt. %.

The oligomer is present in the polybutylene terephthalate ABS or ABS type resin admixture in effective mold release quantities and/or impact improving effective amounts. An amount of material which reduces the amount of pressure needed to eject the article from the mold and obtain a substantially unblemished article is an effective mold releasing amount. In general, effective amounts are from about 0.25 to about 7.5 wt. percent of the polybutylene terephthalate ABS or ABS type resin admixture, preferably to about 0.5 to 5.0 wt. %. The oligomer also brings about increased impact resistance particularly when molding at a higher temperature or under stressed conditions such as low temperature and/or after heat aging. In general, the quantities which bring about this result are similar to the above quantities; however it is possible to see impact resistance improvement at low quantities of oligomer where improved mold release may be difficult to observe.

EXAMPLES 1-3

30 wt. % of an ABS resin having 12.5 wt. % acrylonitrile, 50 wt. % butadiene and 37.5 wt. % styrene was admixed with 70 wt. % Valox 315, a polybutyleneterephthalate, available from GE Plastics and were extruded together with 0.3 phr of a hindered phenol, 0.3 phr of a thioester, 0.2 phr of a phosphite and varying quantities (phr) of Emery 3004 or Emery 3008, a hydrogenated alpha olefin oligomeric fluid. Various parts were molded for the test systems below, all of which were tested using ASTMD 256 for notched izod in ⅛ inch thickness. Below are the results:

TABLE 1

| Example | A | 1 | 2 | 3 |
|---|---|---|---|---|
| Emery 3004 | — | 0.25 | 0.5 | — |
| Emery 3008 | — | — | — | 0.5 |
| Notched Izod ft. lb/in |  |  |  |  |
| Molded at 480° F. |  |  |  |  |
| RT | 16.8 | 17.3 | 17.3 | 17.1 |
| 0° C. | 16.5 | 17.1 | 17.1 | 17.1 |
| −30° C. | 4.2 | 4.3 | 4.5 | 3.7 |
| Molded at 520° F. |  |  |  |  |
| RT | 16.9 | 17.3 | 17.2 | 17.3 |
| °C. | 8.0 | 12.0 | 16.9 | 16.4 |

As can be seen from the results, the presence of the hydrogenated alpha olefin oligomer brought about increased impact resistance at reduced temperature in comparison to the absence of the material in the polybutylene terephthalate ABS system.

EXAMPLE 4

To 10 wt. % KM653 a core shell grafted resin having butadiene, methylmethacrylate and styrene plus small quantities of cross linking and graft linking monomers, available from Rohm and Haas was added 90 wt. % of Valox 315, a polybutylene terephthalate available from GE Plastics, 0.2 phr of a thioester, 0.15 phr of a phosphite and 0.1 phr of a hindered phenol were admixed and extruded. A 1.0 phr of Emery 3004 was added to the Example but not the control (B). Parts were molded in the system below. The notched izod test system was ASTMD 256, ⅛ inch thickness. The tensile test system ASTMD 638. Below are the results:

TABLE 2

| Example | B | 4 |
|---|---|---|
| Emery 3004 phr | — | 1.0 |
| Notched Izod ft. lb/in |  |  |
| Molded at 480° F. |  |  |
| RT | 2.5 | 10.0 |
| 0° C. | 2.1 | 2.4 |
| Molded at 520° F. RT1.93.6 |  |  |
| 0° C. | 1.4 | 1.9 |
| Tensile Str.-Kpsi | 6.5 | 6.4 |
| Tensile Elongation % | 201 | 232 |

The results demonstrate that the presence of an hydrogenated alpha olefin oligomer in a polybutylene terephthalate ABS type resin system can bring about greater impact strength as shown by the data.

EXAMPLES 5 and 6

To 45.9 wt. % Valox 315, previously identified was added 54.1 wt. % of Lexan 141, a bisphenol-A polycarbonate having an intrinsic viscosity of about 0.50–0.52 as measured in methylene chloride at 25° C., available from GE Plastics, was admixed 16.1 phr of Blendex 338, (as calculated on wt of PBT and PC) an ABS having 7.5 wt. % acrylonitrile, 70 wt. % butadiene and 22.5 wt. % styrene, available from GE Plastics.

Also present in the admixture was 1.5 phr titanium dioxide, 0.3 phr of a phosphite, 0.4 phr of a thioester, 0.2 phr of a hindered phenol, 0.1 phr of a diepoxide and 0.05 phr of a phosphorus acid solution, all phr based on weight of PBT and PC. The admixture was extruded and molded in parts and tested in accordance with the tests below. The weight percent Emery is based on PBT and PC.

TABLE 3

| Example | C | 5 | 6 |
|---|---|---|---|
| Emery 3004 phr | — | 0.5 | 1.0 |
| Notched Izod as molded ft lb/in | | | |
| RT | 15.1 | 15.3 | 15.2 |
| −50° C. | 12.9 | 13.0 | 13.2 |
| −60° C. | 9.8 | 12.0 | 12.8 |
| Aged 2 weeks at 120° C. | | | |
| RT | 12.0 | 12.0 | 13.1 |
| Aged 4 weeks at 120° C. | | | |
| −30° C. | 3.3 | 8.1 | 9.4 |
| Tensile Elongation % | 133 | 138 | 139 |
| Tensile Strength-Kpsi | 7.0 | 6.8 | 6.6 |

As shown in the above table, a polybutylene terephthalate, polycarbonate ABS system containing a hydrogenated alpha olefin oligomer provided substantially better impact resistance after extended heat aging and low temperature testing conditions than the polymer system without the oligomer. Other tested values remained about the same.

EXAMPLE 7

0.2 phr of a diepoxide was added to the control formulation A. An ABS similar to the ABS used in Examples 1-3 was used together with the PBT and at the same quantities as in Examples 1-3. Additionally Emery 3008 was employed in the test formulation. Notched Izod under ASTMD 256 was measured at ⅛ inch for parts molded at 480° F. Below are the results.

TABLE 4

| Example | D | 7 |
|---|---|---|
| Emery 3008 phr | — | 0.45 |
| Notched Izod ft lb/in | | |
| RT | 16.2 | 16.3 |
| 0° | 6.0 | 8.0 |

The impact resistance of the polybutylene terephthalate ABS composition having the hydrogenated alpha olefin oligomers was improved.

In all of the above examples, 1-7, effective mold release of molded materials should be obtained.

What is claimed is:

1. A composition comprising an admixture of
   a polybutylene terephthalate
   b a mold release and/or impact improving effective amount of a fluid hydrogenated or non hydrogenated oligomer of an alpha olefin.

2. The composition in accordance with claim 1 wherein the admixture can occur with the already manufactured resin of (b).

3. The composition in accordance with claim 1 wherein polyvinyl chloride and/or dialkyltin mercaptide stabilizer are absent or essentially absent from the composition.

4. The composition in accordance with claim 1 wherein the resin an impact modifying effective amount of a resin comprising acrylonitrile butadiene styrene (ABS) or methylmethacrylate butadiene styrene (MBS), and is present in quantities of from about 3 to about 95 weight percent (a) and (b).

5. The composition in accordance with claim 1 wherein about 0.25 to 7.5 weight percent of the oligomer (c) is present as measured by (a) and (b).

6. The composition in accordance with claim 4 wherein about 0.25 to about 7.5 weight percent of oligomer (c) is present as measured by (a) and (b).

7. The composition in accordance with claim 1 wherein polycarbonate is present.

8. The composition in accordance with claim 4 wherein polycarbonate is present.

9. The composition in accordance with claim 5 wherein polycarbonate is present.

10. The composition in accordance with claim 7 wherein from about 5 to about 200 weight percent polycarbonate is present as measured by (a) and (b).

11. The composition in accordance with claim 8 wherein from about 10 to about 150 weight percent polycarbonate is present as measured by (a) and (b).

12. The composition in accordance with claim 1 wherein (b) is a ABS and (c) is a hydrogenated oligomer of an alpha olefin.

13. The composition in accordance with claim 1 wherein (b) is a MBS and (c) is a hydrogenated oligomer of an alpha olefin.

* * * * *

UNITED STATES PATENT AND TRADEMARK OFFICE
CERTIFICATE OF CORRECTION

PATENT NO. : 5,008,315

DATED : April 16, 1991

INVENTOR(S) : Linda Harmon Nelson

It is certified that error appears in the above-identified patent and that said Letters Patent is hereby corrected as shown below:

Column 8
      Line 20
      Add "(b)" after resin

Column 8
      Line 20 through 23
      Cancel "an impact modifying effective amount of a resin
           comprising acrylonitrile butadiene styrene (ABS)
           or methylmethacrylate butadiene styrene (MBS), and"

Signed and Sealed this

Fifteenth Day of September, 1992

*Attest:*

DOUGLAS B. COMER

*Attesting Officer*      *Acting Commissioner of Patents and Trademarks*